(12) United States Patent
Zhang et al.

(10) Patent No.: US 7,477,488 B1
(45) Date of Patent: Jan. 13, 2009

(54) HEAD SUSPENSION WITH A REINFORCED LIMITER TAB

(75) Inventors: Yiduo Zhang, Cupertino, CA (US);
Darrell D. Palmer, Roseville, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 487 days.

(21) Appl. No.: 11/385,266

(22) Filed: Mar. 21, 2006

(51) Int. Cl.
*G11B 5/55* (2006.01)
(52) U.S. Cl. .................................... 360/245.7
(58) Field of Classification Search ............... 360/245.7
See application file for complete search history.

(56) References Cited

U.S. PATENT DOCUMENTS

| | | |
|---|---|---|
| 6,538,850 B1 | 3/2003 | Hadian et al. |
| 7,369,366 B2 * | 5/2008 | Kim et al. ................. 360/245.7 |
| 2005/0174696 A1 | 8/2005 | Choi et al. |

* cited by examiner

*Primary Examiner*—A. J. Heinz

(57) ABSTRACT

A head suspension for a head/gimbal assembly comprises a flexure attached to a load beam. The load beam includes a lifter tab configured to engage a lifting surface of a load/unload ramp. The flexure includes a limiter tab, extending from a trailing edge thereof, that is configured to engage with a gimbal-limiting surface of the load/unload ramp. The limiter tab comprises a metallic base layer, a metallic stiffening layer, and a non-metallic intermediate layer disposed between the base and stiffening layers. The stiffening layer can include both conductive traces that terminate with a set of bonding pads and an appendage that extends along a length of the limiter tab. The appendage portion of the stiffening layer serves to increase the thickness of the limiter tab to increase the stiffness of the limiter tab.

13 Claims, 5 Drawing Sheets

(PRIOR
ART)**

(PRIOR
ART)**

HEAD SUSPENSION WITH A REINFORCED LIMITER TAB

BACKGROUND OF THE INVENTION

1. Field of the Invention

The present invention relates generally to the field of disk drives and more particularly to suspensions for heads thereof.

2. Description of the Prior Art

Magnetic, optical, and magneto-optical disk drives store and retrieve data for digital electronic apparatuses such as computers and entertainment devices. FIG. 1 shows that the typical disk drive comprises a head 100 in very close proximity to a surface of a rotatable disk 110. FIG. 2 show a side view of the head 100 over the disk 110. As shown in FIG. 2, the head 100 includes a slider 200 and a transducer 210. The transducer 210, in turn, includes a read element and optionally a write element. As the disk 110 rotates beneath the head 100, a very thin air bearing is formed between the surface of the disk 110 and an air bearing surface (ABS) of the slider 200. The air bearing causes the head 100 to "fly" above the surface of the disk 110. As the head 100 flies over the disk 110, the write element and the read element can be alternately employed to write and read data bits along data tracks on the disk 110.

In order to keep the head 100 properly oriented and at the correct height above the disk 110 while in flight, disk drives employ a head gimbal assembly (HGA) that comprises the head 100 and a suspension that further includes a load beam 220 and a flexure 230 that attaches the head 100 to the load beam 220.

In some disk drives, when not in operation, the head 100 comes to rest on the surface of the disk 110 in a designated area known as a parking zone. In these disk drives the parking zone cannot be used for data storage. For this and other reasons, in some disk drives the head 100 is instead parked on a load/unload ramp disposed proximate to the outer diameter of the disk 110. FIG. 3 illustrates two HGAs 300, 310, in up and down configurations, respectively, for accessing opposite sides of the disk 110 (not shown in FIG. 3). In FIG. 3 the HGAs 300, 310 are engaged with a load/unload ramp 320. More specifically, a lifter tab 240 (see FIG. 2) that extends from the load beam 220 engages the load/unload ramp 320.

Because of the close proximity of the HGAs 300, 310 when parked on the load/unload ramp 320, and because of the flexibility of the flexures 230, the heads 100 of the respective HGAs 300, 310 can collide with each other if the disk drive experiences a mechanical shock, such as when dropped. To prevent such collisions, and/or to prevent excessive deflection of the flexures 230 that might lead to yielding and plastic deformation, some load/unload ramps 320 include a gimbal-limiting surface 330 for each HGA 300, 310, and each flexure 230 includes a limiter tab 250 (see FIG. 2), also known as a $3^{rd}$ limiter. As shown in FIG. 3, the limiter tabs 250 do not typically touch the gimbal-limiting surfaces 330 except as necessary to prevent the heads 100 from exceeding an acceptable range of motion.

As requirements for the shock performance have increased, limiter tabs have been made more stiff by making the limiter tabs wider. FIG. 4 illustrates a bottom view of one such design. In FIG. 4, a head 400 is attached to a suspension 410 that comprises a flexure 420 having a limiter tab 430 extending from a trailing edge thereof. Unfortunately, widening the limiter tab 430 for increased stiffness also undesirably increases the total mass and inertia of the HGA. Also, widening the limiter tab 430 may begin to interfere with design options for tabs 440, used to hold the suspension 410 to a carrier strip (not shown) prior to separation from the carrier strip (a.k.a. "de-tabbing").

Accordingly, there is a need in the art for a stiffer limiter tab that adds less mass and inertia to the HGA.

SUMMARY

An exemplary head suspension for a head/gimbal assembly comprises a load beam and a flexure attached to the load beam. The load beam includes a lifter tab, extending from a trailing edge thereof, configured to engage a lifting surface of a load/unload ramp. The flexure includes a limiter tab extending from a trailing edge thereof that is configured to engage with a gimbal-limiting surface of the load/unload ramp. The limiter tab comprises a metallic base layer, a metallic stiffening layer, and a non-metallic intermediate layer disposed between the base and stiffening layers. In an exemplary embodiment the base layer includes stainless steel and the intermediate layer includes polyimide. The stiffening layer can extend essentially to a distal end of the limiter tab to provide the desired stiffening. In some embodiments the flexure includes a conductor layer that includes conductive traces for electrical communication with a head attached to the flexure. In some of these embodiments an appendage of the conductor layer comprises the stiffening layer of the limiter tab.

DETAILED DESCRIPTION OF THE INVENTION

Figure 1:
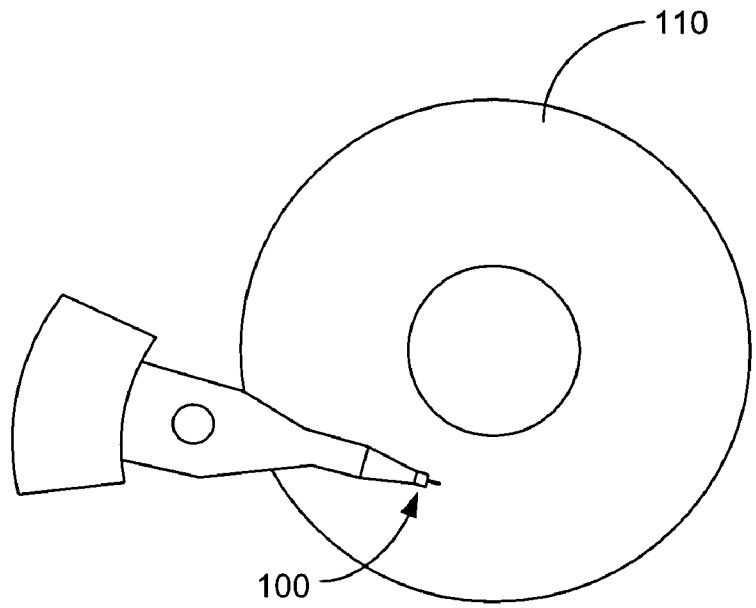
FIGS. 1 and 2 show top and side views, respectively, of a head and disk of a disk drive according to the prior art.
Figure 2:
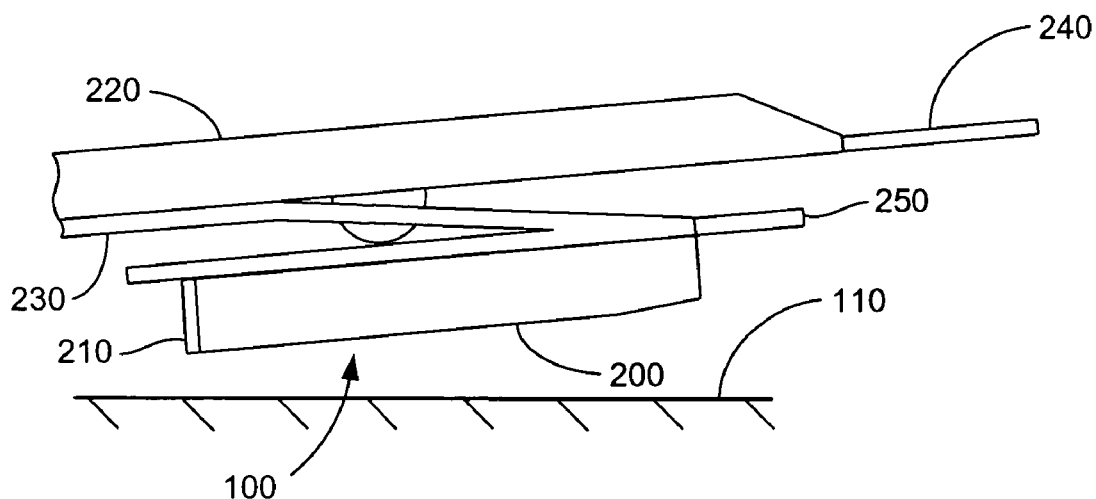
Figure 3:
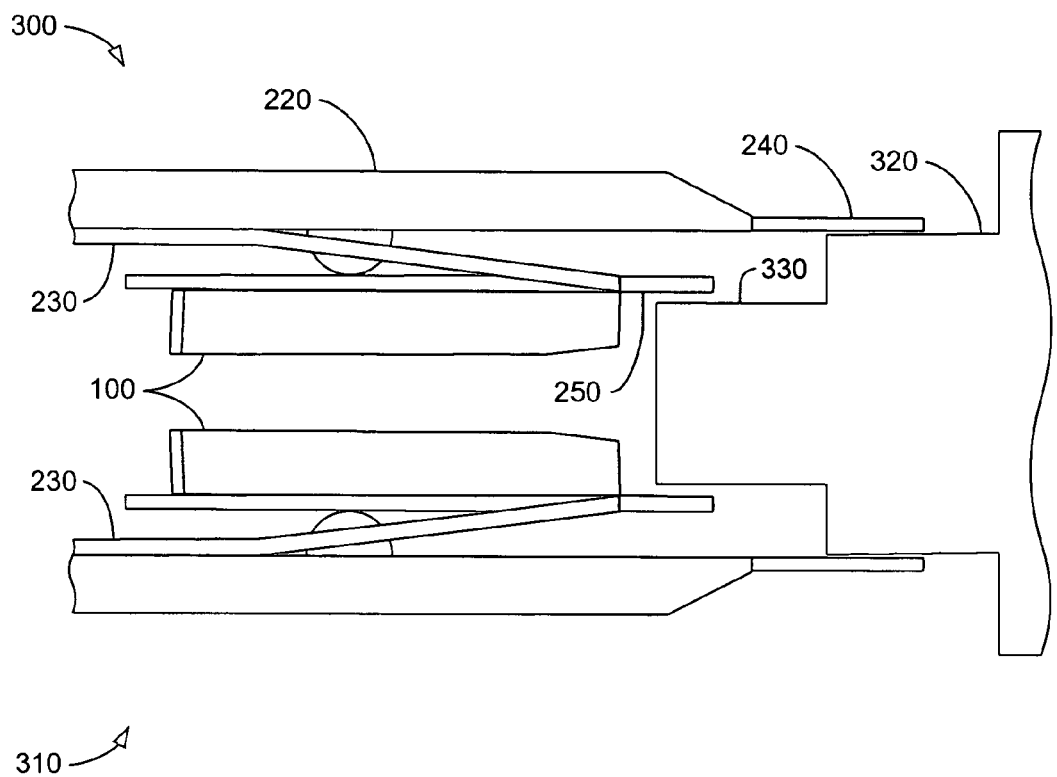
FIG. 3 shows a side view of two HGAs engaged with a load/unload ramp according to the prior art.
Figure 4:
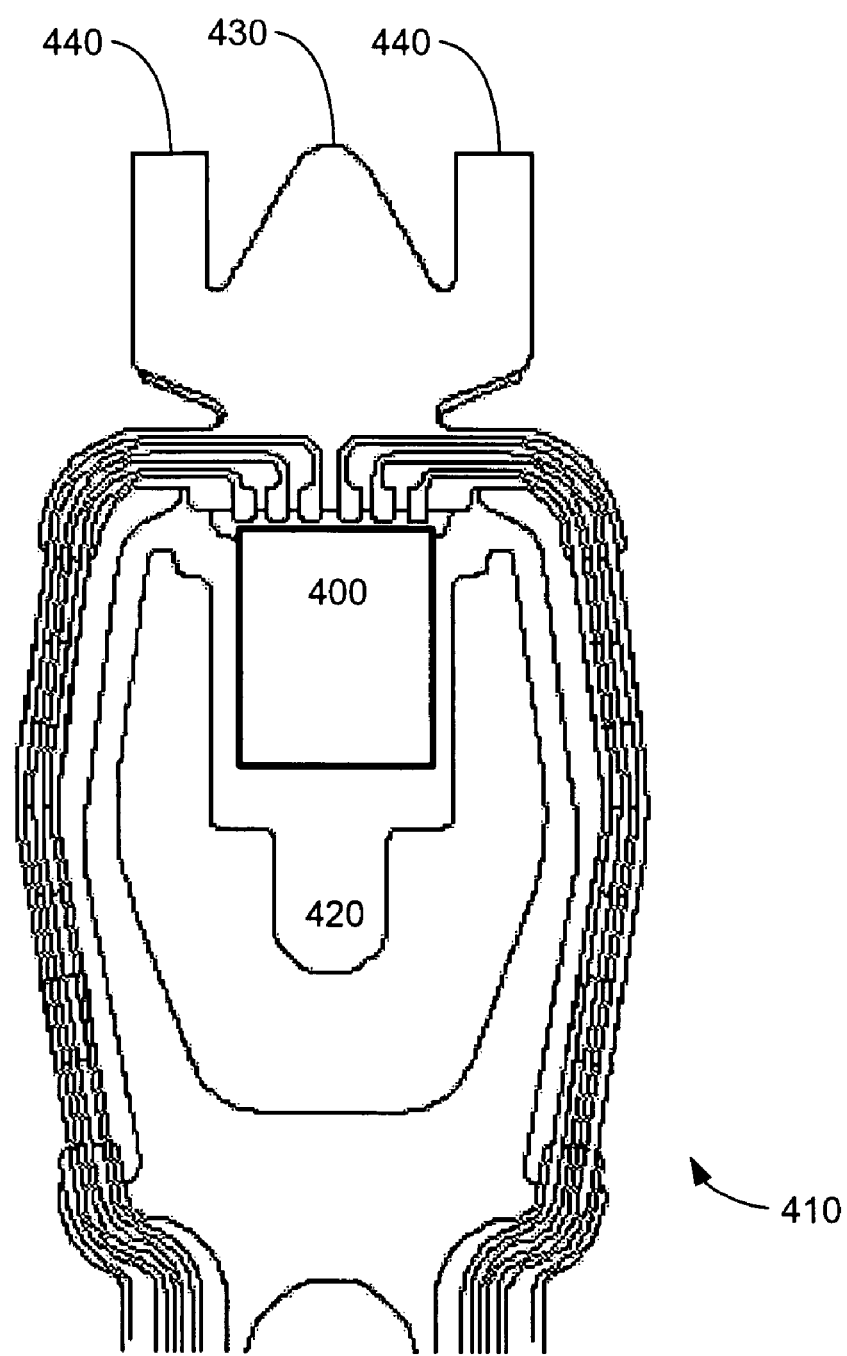
FIG. 4 shows a bottom view of a head and suspension according to the prior art.
Figures 5, 6:
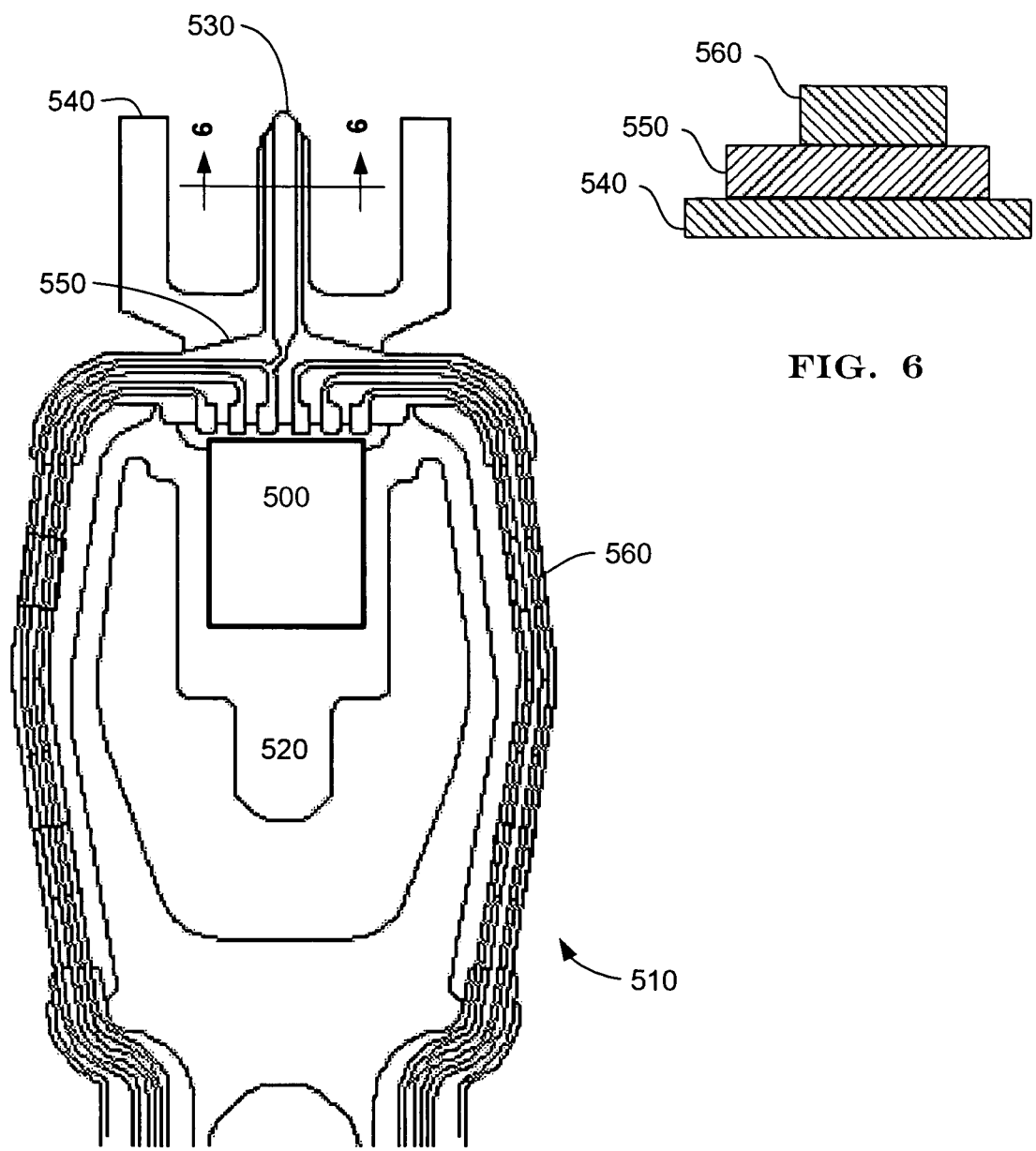
FIG. 5 shows a bottom view of a head and suspension including a limiter tab according to an exemplary embodiment of the present invention.
FIG. 6 shows a cross-sectional view of the limiter tab of FIG. 5.

FIG. 5 shows a bottom view of a head 500 attached to a suspension 510 according to an exemplary embodiment of the present invention. The suspension 510 comprises a flexure 520 having a limiter tab 530 extending from a trailing edge thereof. The flexure 520, in turn, comprises a base layer 540, an intermediate layer 550, and a conductor layer 560, a portion of which serves as a stiffening layer of the limiter tab 530.

The base layer 540 includes stainless steel in some embodiments, though in other embodiments the base layer can comprise other metals or ceramic materials. Where the base layer 540 is metallic, the intermediate layer 550 serves as an electrical insulator and in some embodiments includes polyimide. The conductor layer 560 includes electrical traces, such as of copper, that provide electrical communication to the head 500. The portion of the conductor layer 560 that extends along the length of the limiter tab 530, however, provides stiffening to the limiter tab 530 rather than electrical connectivity and therefore does not particularly need to be electrically conductive.

FIG. 6 shows a cross-sectional view through the limiter tab 530 along the line 6-6 in FIG. 5. It can be seen that the intermediate layer 550 is disposed between the base layer 540 and the conductor layer 560. A suitable thickness of the base layer 540 is in the range of about 15 µm to 25 µm. A suitable thickness of the intermediate layer 550 is in the range of about 5 µm to 25 µm. A suitable thickness of the conductor layer 560 is in the range of about 5 µm to 20 µm and can be about 12 µm or about 18 µm in some embodiments. The stiffness of the limiter tab 530 is a function of the overall thickness of the limiter tab which increases with the thickness of the conductor layer 560. Advantageously, making the limiter tab 530 more stiff in this manner allows the limiter tab 530 to be made more narrow, and a narrower limiter tab 530 decreases the total mass and inertia of the suspension 510.

It will be appreciated that in some embodiments the base layer 540 includes traces that are electrically conductive. For example, the flexure 520 can comprise a ceramic substrate with a three layer structure disposed thereon. In this alternative embodiment the three layers comprise the base layer 540 including electrical traces, the intermediate layer 550, and the conductor layer 560 that provides further stiffening to the limiter tab 530.

Figure 7:
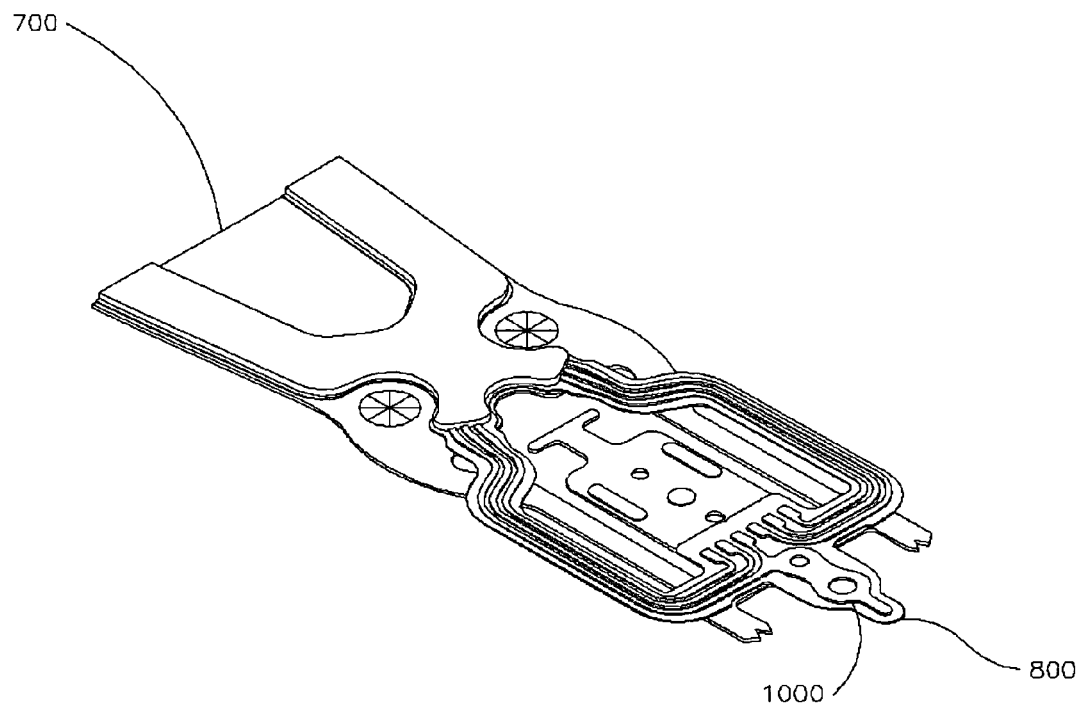
FIG. 7 shows a perspective view of a suspension according to another embodiment of the present invention.
Figure 8:
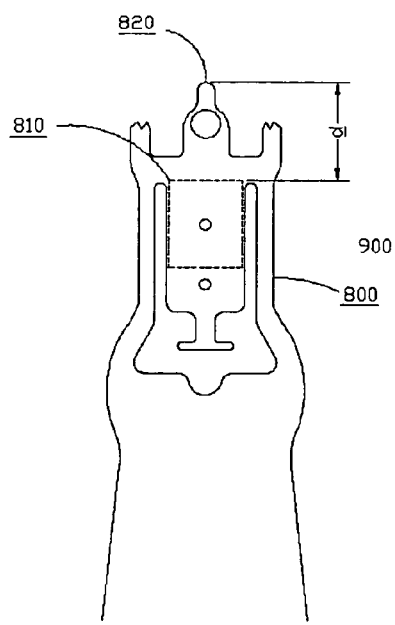
FIGS. 8-10 show respective layers that comprise the suspension shown in FIG. 7.
Figure 9:
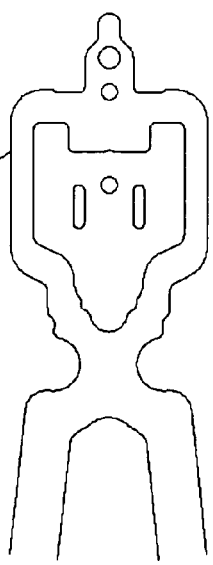
Figure 10:
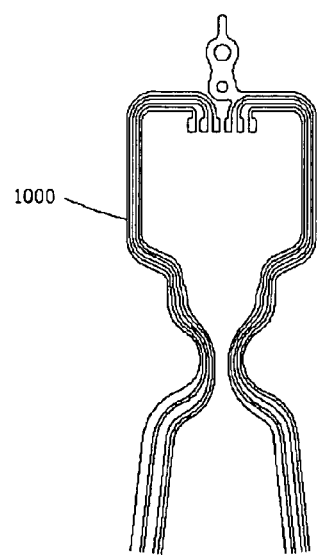

FIG. 7 shows a perspective view of a suspension 700 according to another embodiment of the present invention. FIGS. 8-10 show the individual base layer 800, intermediate layer 900, and conductor layer 1000 that comprise the suspension 700. In FIG. 8, the base layer 800 includes a head mounting surface 810 for attaching a head to the suspension 700. A distance, d, between a trailing edge of the head mounting surface 810 and a distal end 820 of the limiter tab is at least 1.0 mm, in some embodiments. In further embodiments, the distance between the trailing edge of the head mounting surface 810 and the distal end 820 of the limiter tab is in the range of 1.0 mm to 2.5 mm. As shown in FIG. 7, the stiffening layer 1000 can extend essentially to the distal end 820 of the limiter tab.

It should be noted that in the embodiments shown in FIGS. 5 and 7 the appendage of the conductor layer 560, 1000 that comprises the stiffening layer of the limiter tab is electrically connected to a trace that terminates at one of the bonding pads. As noted above, the electrical connection to the appendage is not necessary in these embodiments, however, greater stiffness is achieved by not having a gap between the appendages and the traces to which they are connected. Thus, it is a matter of fabrication efficiency to make the stiffening layer and the traces of a common layer of the same material with the same thickness. However, the invention also includes embodiments in which the composition and/or the thickness of the stiffening layer is different than that of the conductor layer of the flexure.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

We claim:

1. A head suspension for a head/gimbal assembly, the suspension comprising:
   a load beam including a lifter tab, extending from a trailing edge thereof, configured to engage a lifting surface of a load/unload ramp; and
   a flexure attached to the load beam and including a limiter tab extending from a trailing edge of the flexure and comprising a metallic base layer, a metallic stiffening layer, and a non-metallic intermediate layer disposed between the base and stiffening layers, the limiter tab configured to engage with a gimbal-limiting surface of the load/unload ramp.

2. The head suspension of claim 1 wherein the stiffening layer includes copper.

3. The head suspension of claim 2 wherein the base layer includes stainless steel.

4. The head suspension of claim 1 wherein a thickness of the base layer is in the range of about 15 µm to 25 µm.

5. The head suspension of claim 1 wherein a thickness of the stiffening layer is in the range of about 5 µm to 20 µm.

6. The head suspension of claim 1 wherein a thickness of the stiffening layer is about 12 µm.

7. The head suspension of claim 1 wherein a thickness of the stiffening layer is about 18 µm.

8. The head suspension of claim 1 wherein the stiffening layer extends essentially to a distal end of the limiter tab.

9. The head suspension of claim 1 wherein the intermediate layer includes polyimide.

10. The head suspension of claim 1 wherein a thickness of the intermediate layer is in the range of about 5 µm to 25 µm.

11. The head suspension of claim 1 wherein the flexure includes a head mounting surface and a distance between a trailing edge of the head mounting surface and a distal end of the limiter tab is at least 1.0 mm.

12. The head suspension of claim 11 wherein the distance between the trailing edge of the head mounting surface and the distal end of the limiter tab is in the range of 11.0 mm to 2.5 mm.

13. The head suspension of claim 11 wherein the flexure includes a conductor layer and an appendage of the conductor layer comprises the stiffening layer.

* * * * *